United States Patent
Yang et al.

(10) Patent No.: US 10,331,838 B2
(45) Date of Patent: Jun. 25, 2019

(54) SEMICONDUCTOR DEVICE WITH FILL CELLS

(71) Applicant: TAIWAN SEMICONDUCTOR MANUFACTURING CO., LTD., Hsinchu (TW)

(72) Inventors: Jung-Chan Yang, Taoyuan (TW); Hui-Zhong Zhuang, Kaohsiung (TW); Ting-Wei Chiang, New Taipei (TW); Yun-Xiang Lin, Hsinchu County (TW); Tien-Yu Kuo, Hsinchu (TW); Shu-Yi Ying, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 98 days.

(21) Appl. No.: 15/660,130

(22) Filed: Jul. 26, 2017

(65) Prior Publication Data

US 2018/0165399 A1   Jun. 14, 2018

Related U.S. Application Data

(60) Provisional application No. 62/433,159, filed on Dec. 12, 2016.

(51) Int. Cl.
*G06F 17/50* (2006.01)
*H01L 21/77* (2017.01)

(52) U.S. Cl.
CPC .......... *G06F 17/5072* (2013.01); *H01L 21/77* (2013.01); *G06F 2217/12* (2013.01); *Y02P 90/265* (2015.11)

(58) Field of Classification Search
CPC .............. G06F 17/5072; G06F 17/5077; G06F 2217/12
USPC ............. 716/124, 122, 123, 125, 54, 55, 53; 703/15
See application file for complete search history.

(56) References Cited

U.S. PATENT DOCUMENTS

| | | | |
|---|---|---|---|
| 8,782,576 B1 * | 7/2014 | Bowers | H01L 27/11521 716/55 |
| 2003/0198101 A1 * | 10/2003 | Pio | G11C 8/08 365/200 |
| 2004/0129986 A1 * | 7/2004 | Kobayashi | G11C 16/0491 257/390 |
| 2009/0113368 A1 * | 4/2009 | Lin | G06F 17/5068 716/122 |
| 2010/0133627 A1 * | 6/2010 | Mizukami | G11C 16/0483 257/392 |

(Continued)

OTHER PUBLICATIONS

Dhumane, "Critical Area Driven Dummy Fill Inserterion to Improve Manufacturing Yield", Masters Thesis, University of Massachusetts Amherst, ScholarWorks@UMassAmherst, Feb. 2014, 30 pages. (Year: 2014).*

(Continued)

*Primary Examiner* — Phallaka Kik
(74) *Attorney, Agent, or Firm* — Maschoff Brennan

(57) ABSTRACT

A layout method is disclosed that includes: placing function cells in a layout, corresponding to at least one design file, of an integrated circuit; and inserting at least one fill cell that is configured without cut pattern to fill at least one empty region between the function cells each comprising at least one cut pattern on at least one edge abutting the at least one empty region.

20 Claims, 8 Drawing Sheets

(56) References Cited

U.S. PATENT DOCUMENTS

2016/0328510 A1* 11/2016 Ueberreiter ......... G06F 17/5072
2017/0256559 A1*  9/2017 Yoon ................. H01L 27/11578
2017/0371994 A1* 12/2017 Bowers ............... G06F 17/5072

OTHER PUBLICATIONS

Ogino et al., "The Influence of Dummy Fills on an On-chip Spiral Inductor and their Optimized Placement Scheme", IEEE, 2008, 4 pages. (Year: 2008).*
Subramanian et al., "Performance Impact from Metal Fill Insertion", Freescale Semiconductor Session#4.2, http://pdf2.solecsy.com/572/8ef8273a-7640-4453-8511-37267868fd8e.pdf, 2007, 12 pages. (Year: 2007).*
Tao et al., "A Novel Unified Dummy Fill Insertion Framework with SQP-Based Optimization Method", ICCAD '16, Nov. 7-10, 2016, Austin, Tx, USA, 8 pages. (Year: 2016).*
Zhao et al., "Generating integrated-circuit patterns via cutting and stitching of gratings", Birck and NCN Publications, Paper 469, 2009, pp. 2750-2754. (Year: 2009).*

* cited by examiner

SEMICONDUCTOR DEVICE WITH FILL CELLS

RELATED APPLICATIONS

This application claims priority to U.S. provisional application Ser. No. 62/433,159, filed Dec. 12, 2016, which is herein incorporated by reference.

BACKGROUND

When semiconductor devices are to be manufactured, different cells and routings are placed. However, as technology of the semiconductor devices keeps scaling, the process window shrinks dramatically. The manufacturing of the semiconductor devices becomes more and more challenging since the process limitation rule becomes stricter.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
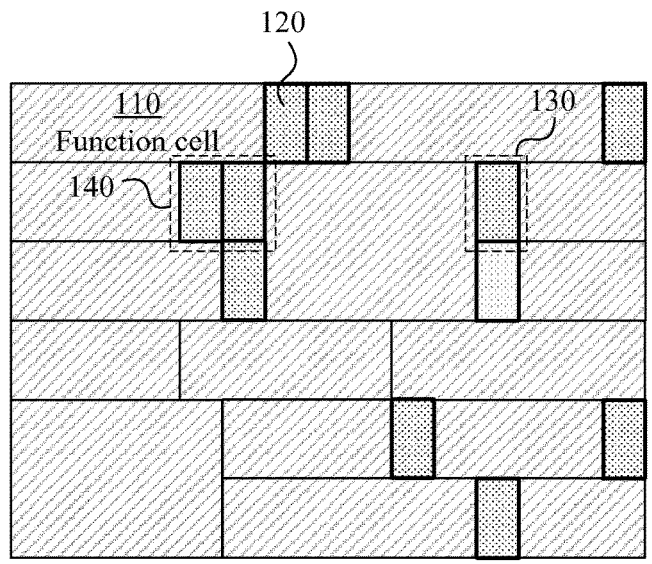
FIG. 1 is an exemplary layout diagram of a semiconductor device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

FIG. 1 is an exemplary layout diagram of a semiconductor device 100 in accordance with various embodiments of the present disclosure.

In some embodiments, the semiconductor device 100 is implemented as, or includes, an integrated circuit that includes function cells 110 illustrated as blank blocks in FIG. 1. In some embodiments, each of the function cells 110 is configured to perform a specific function. For example, in various embodiments, the function cells 110 include inverters, operational amplifiers, logic gates or the like. In some embodiments, the function cells 110 also include routings (not shown) to electrically couple the function cells 110 with each other.

The number and the configuration of the function cells 110 in FIG. 1 are given for illustrative purposes. Various numbers and the configurations of the function cells 110 in the semiconductor device 100 are within the contemplated scope of the present disclosure.

The semiconductor device 100 further includes empty regions that are configured to be filled with fill cells 120 between the function cells 110. For illustration, the fill cells 120 are illustrated as dotted patterns in FIG. 1.

In some embodiments, the fill cells 120 are filled to keep the structure and/or layout of the semiconductor device 100 uniform and/or complete.

Figure 2:
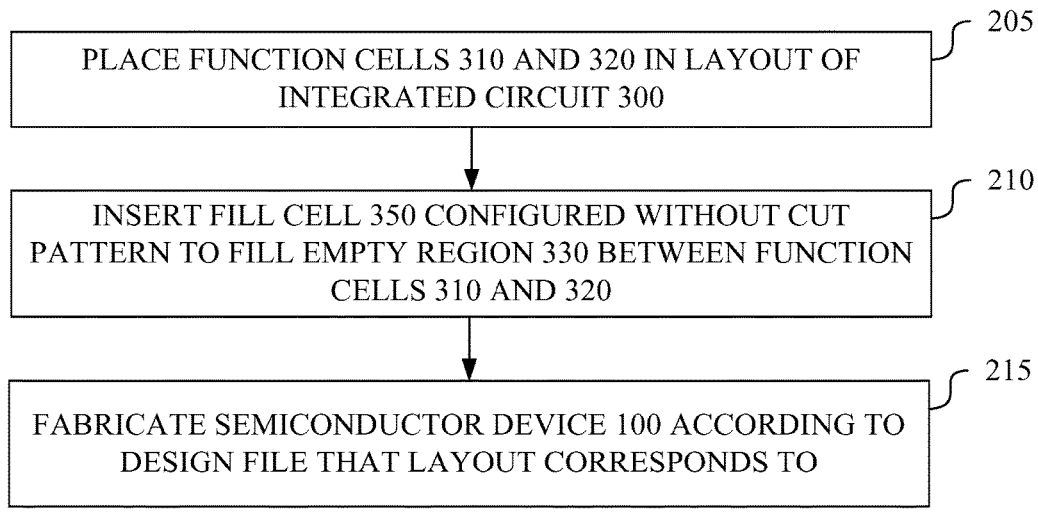
FIG. 2 is a flow chart of a method illustrating a layout process of the cells shown in FIG. 1, corresponding to an integrated circuit, in accordance with some embodiments of the present disclosure.

FIG. 2 is a flow chart of a method 200 illustrating a layout process of the cells shown in FIG. 1, corresponding to an integrated circuit 300, in accordance with some embodiments of the present disclosure.

Figure 3A:
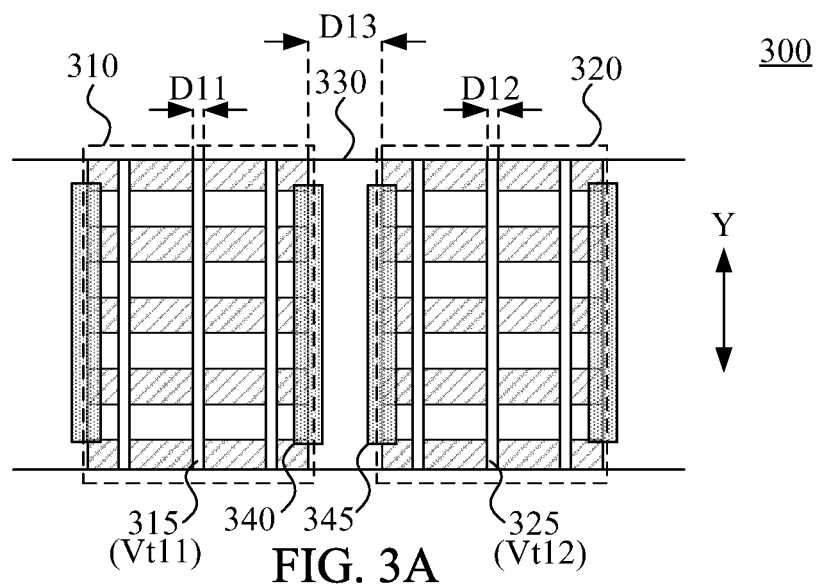
FIG. 3A and FIG. 3B are exemplary layout diagrams of the integrated circuit implemented by using the method illustrated in FIG. 2 in accordance with various embodiments of the present disclosure.
Figure 3B:
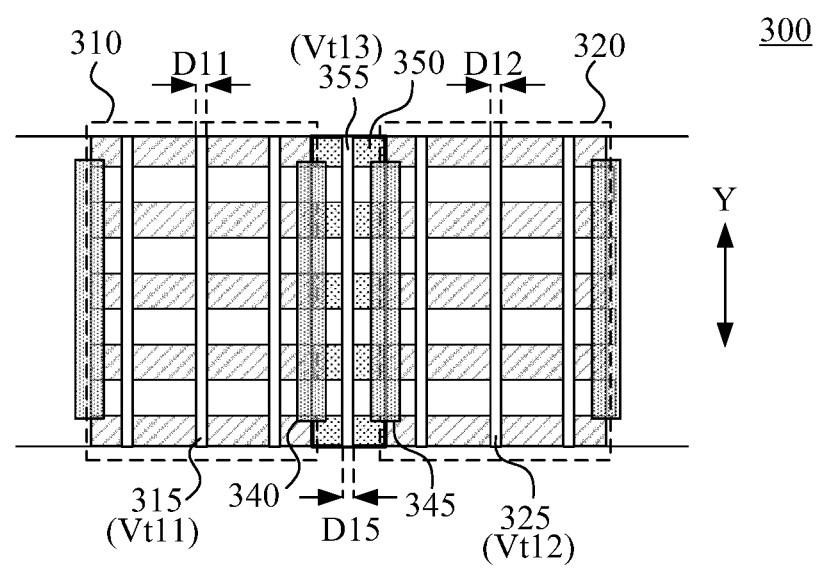

FIG. 3A and FIG. 3B are exemplary layout diagrams of the integrated circuit 300 implemented by using the method illustrated in FIG. 2 in accordance with various embodiments of the present disclosure.

With reference to the method 200 illustrated in FIG. 2 and the integrated circuit 300 illustrated in FIG. 3A, in operation 205, a function cell 310 and a function cell 320 are placed in a layout of the integrated circuit 300. In some embodiments, the layout of the integrated circuit 300 corresponds to at least one design file.

As illustratively shown in FIG. 3A, the function cell 310 includes three gates 315 extending along, for example, a Y direction, and each one of the gates 315 has a width D11. The function cell 320 includes three gates 325 extending along the Y direction, and each one of the gates 325 has a width D12. In some embodiment, the width D11 of each of the gates 315 and the width D12 of each of the gates 325 are the same. In some embodiments, a threshold voltage Vt11 of each of the gates 315 and a threshold voltage Vt12 of each of the gates 325 are the same.

For simplicity, only one gate 315 and only one gate 325 are labeled in FIG. 3A. The number of the gates 315 in the function cell 310 and the gates 325 in the function cell 320 in FIG. 3A are given for illustrative purposes. Various numbers of the gates 315 and gates 325 are within the contemplated scope of the present disclosure.

For illustration of FIG. 3A, an empty region 330 is located between the function cell 310 and the function cell 320, in which no electrical circuit or component is formed within the empty region 330. In some embodiments, the empty region 330 has a width D13 of one cell pitch.

For illustration, the function cell 310 includes a cut pattern 340 on an edge abutting the empty region 330. The function cell 320 includes a cut pattern 345 on an edge abutting the empty region 330. In some embodiments, the cut pattern 340 and the cut pattern 345 extend along the Y direction. In some embodiments, the cut patterns 340 and 345 are configured to provide electrical isolation to the function cell 310 and the function cell 320 respectively from the empty region 330.

With reference to the method 200 illustrated in FIG. 2 and the integrated circuit 300 illustrated in FIG. 3B, in operation 210, a fill cell 350 that is configured without cut pattern is inserted to fill the empty region 330 between the function cells 310 and 320.

With reference to the method 200 illustrated in FIG. 2 and the integrated circuit 300 illustrated in FIG. 3B, in operation 215, the semiconductor device 100 is fabricated according to the at least one design file that the layout of the integrated circuit 300 corresponds to.

Figure 4A:
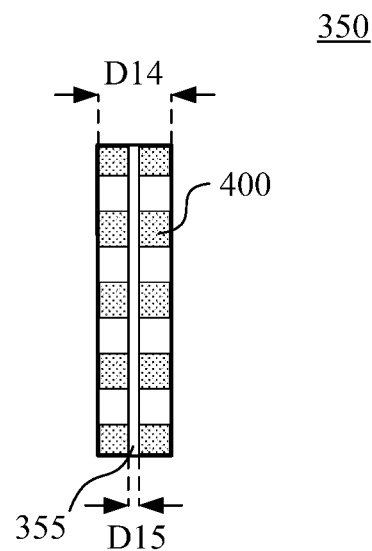
FIG. 4A is an exemplary diagram of the fill cell illustrated in FIG. 3B, in accordance with various embodiments of the present disclosure.

FIG. 4A is an exemplary diagram of the fill cell 350 illustrated in FIG. 3B, in accordance with various embodiments of the present disclosure.

As illustratively shown in FIG. 4A, the fill cell 350 includes a metal layer 400. As shown in FIG. 4A, the metal layer 400 includes, for illustration, five patterns in the fill cell 350. In some embodiments, the metal layer 400 extends along a direction. In some embodiments, such a direction in which the metal layer 400 extends along is the Y direction illustrated in FIG. 3A and FIG. 3B. For illustration, in various embodiments, the metal layer 400 extends along the Y direction illustrated in FIG. 3A and FIG. 3B, such that the metal layer 400 includes more than five patterns in the fill cell 350.

In some embodiments, a width of the fill cell 350 is D14 and the width D14 is the same as the width D13 of the empty region 330 in FIG. 3A, which is one cell pitch.

For illustration in FIG. 3B and FIG. 4A, the fill cell 350 further includes a single gate 355 arranged in a central area of the metal layer 400. In some embodiments, the gate 355 extends along the Y direction, as the gates 315 and 325, and crosses the metal layer 400. In some embodiments, a width of the gate 355 is D15 that is smaller than the width D14. In some embodiments, the gate 355 is configured to have a threshold voltage of Vt13.

Figure 4B:
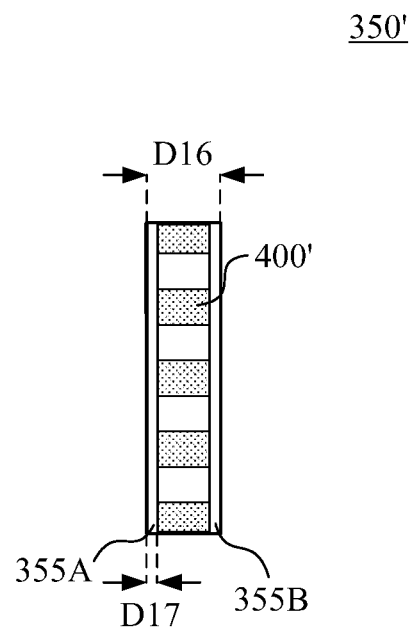
FIG. 4B is another exemplary diagram of a fill cell in accordance with various embodiments of the present disclosure.

FIG. 4B is another exemplary diagram of a fill cell 350' in accordance with various embodiments of the present disclosure.

As illustratively shown in FIG. 4B, the fill cell 350' includes a metal layer 400'. As shown in FIG. 4B, the metal layer 400' includes, for illustration, five patterns in the fill cell 350'. In some embodiments, the metal layer 400' extends along a direction. In some embodiments, such a direction in which the metal layer 400' extends along the Y direction illustrated in FIG. 3A and FIG. 3B. For illustration, in various embodiments, the metal layer 400' extends along the Y direction illustrated in FIG. 3A and FIG. 3B, such that the metal layer 400' includes more than five patterns in the fill cell 350'.

For illustration in FIG. 4B, compared to FIG. 4A, the fill cell 350' includes two gates 355A and 355B arranged on two respective edges of the metal layer 400'. In some embodiments, both of the gates 355A and 355B extend along the Y direction and cross the metal layer 400'.

In some embodiments, a width of the fill cell 350' is D16 and the width D16 is one cell pitch. A width of each one of the gates 355A and 355B is D17. In some embodiments, the width D14 is the same as the width D16. In some embodiments, the width D15 is the same as the width D17.

In some embodiments with respect to FIG. 4B, each of the gates 355A and 355B is configured to have the threshold voltage of Vt13.

In some embodiments, the fill cell 350 illustrated in FIG. 4A and the fill cell 350' illustrated in FIG. 4B are cells without any function. In some embodiments, the fill cell 350 and the fill cell 350' are configured without cut pattern and able to be inserted to fill the empty region between function cells.

As illustratively shown in FIG. 3B, the fill cell 350 is exemplarily illustrated to be inserted between the function cell 310 and the function cell 320 to fill the empty region 330.

The function cell 310 and the function cell 320 illustrated in FIG. 3A are given for illustrative purposes. Various function cells are within the contemplated scope of the present disclosure. For example, in various embodiments, when the fill cell 350' illustrated in FIG. 4B is to be used, the fill cell 350' is inserted between suitable function cells (not shown), that are different from the function cells 310 and 320, to fill an empty region between the suitable function cells. Alternatively stated, the patterns of the function cells 310 and 320 in FIG. 3A need to be modified accordingly, such that the fill cell 350' is suitable to fill the empty region 330 therebetween.

In some embodiments, the width D15 of the gate 355 of the fill cell 350 is the same as the width D11 of each of the gates 315 of the function cell 310, and/or the width D12 of each of the gates 325 of the function cell 320. In some embodiments, the threshold voltage Vt13 of the gate 355 of the fill cell 350 is the same as the threshold voltage Vt11 of each of the gates 315, and/or the threshold voltage Vt12 of each of the gates 325.

For illustration of FIG. 3B, the fill cell 350 without the cut pattern shares the cut pattern 340 on the edge of the function cell 310. At the same time, the fill cell 350 shares the cut pattern 345 on the edge of the function cell 320. Moreover, by employing the gate 355 having the same width and/or the same threshold voltage as those of the gates 315 and the gates 325, the fill cell 350 is inserted to keep the structure of the integrated circuit 300 illustrated in FIG. 3B uniform, so as to meet the requirement of placing and routing rule.

In some embodiments, the integrated circuit 300 shown in FIG. 3B corresponds to a portion of the semiconductor device 100 in FIG. 1. For illustration, the integrated circuit 300 shown in FIG. 3B corresponds to a region 130 of the semiconductor device 100 within a dashed line frame illustrated in FIG. 1.

In some embodiments, the layout of the semiconductor device 100 in FIG. 1 or the integrated circuit 300 in FIG. 3B corresponds to at least one design file. In some embodiments, after the empty region of the semiconductor device 100 or the integrated circuit 300 is filled with the fill cell, the semiconductor device 100 or the integrated circuit 300 is able to be fabricated according to the at least one design file.

In some approaches, a fill cell may include cut pattern on edges of itself. When the fill cell with cut pattern is inserted into an empty region in a layout, the layout may violate the process limitation rule. Compared to the approaches discussed above, by employing the fill cell without cut pattern, as illustrated in FIG. 4A and FIG. 4B, the process limitation rule will not be violated, and the requirement of placing and routing rule can be satisfied.

The number and the order of the operations illustrated in FIG. 2 are given for illustrative purposes. Various numbers and the orders of the operations are within the contemplated scope of the present disclosure.

Figure 5:
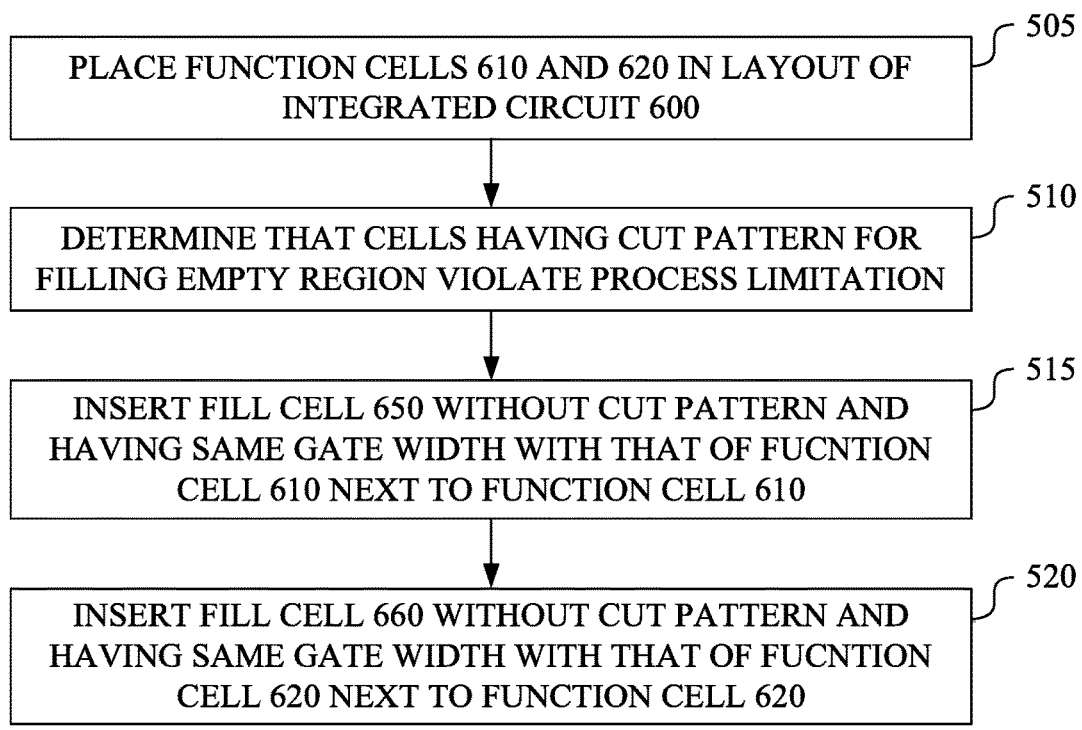
FIG. 5 is another flow chart of a method illustrating a layout process of the cells shown in FIG. 1, corresponding to an integrated circuit, in accordance with some embodiments of the present disclosure.

FIG. 5 is another flow chart of a method 500 illustrating a layout process of the cells shown in FIG. 1, corresponding to an integrated circuit 600, in accordance with some embodiments of the present disclosure.

Figure 6A:
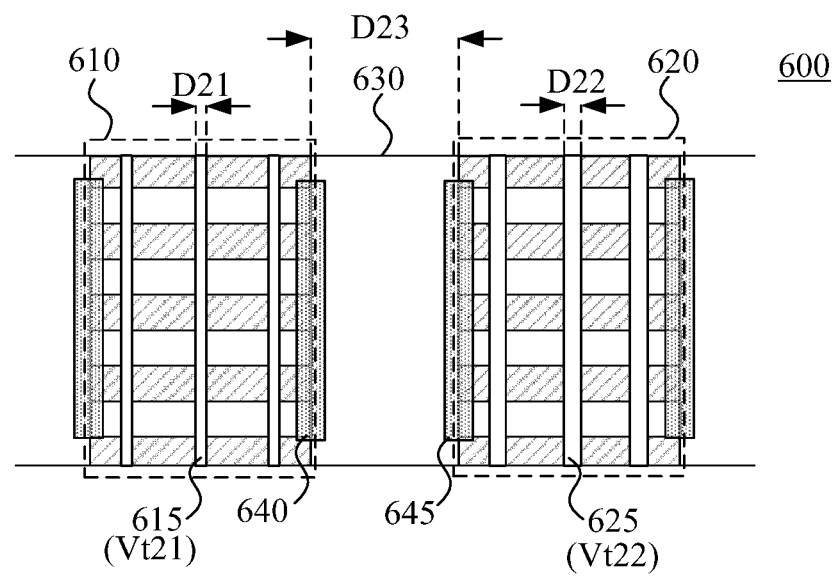
FIG. 6A and FIG. 6B are exemplary layout diagrams of the integrated circuit implemented by using the method illustrated in FIG. 5 in accordance with various embodiments of the present disclosure.
Figure 6B:
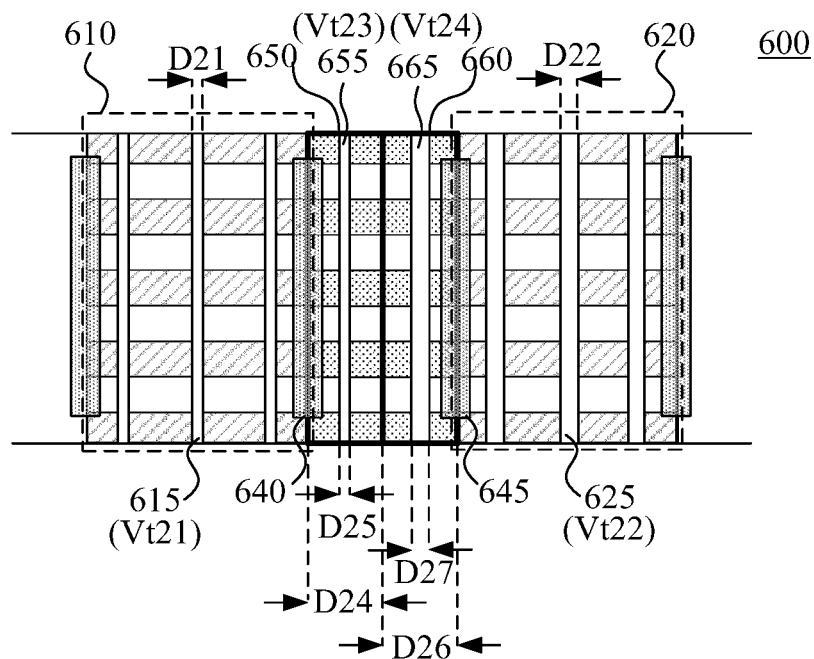

FIG. 6A and FIG. 6B are exemplary layout diagrams of the integrated circuit 600 implemented by using the method illustrated in FIG. 5 in accordance with various embodiments of the present disclosure.

With reference to the method 500 illustrated in FIG. 5 and the integrated circuit 600 illustrated in FIG. 6A, in operation 505, a function cell 610 and a function cell 620 are placed in a layout of the integrated circuit 600. In some embodiments, the layout of the integrated circuit 600 corresponds to at least one design file.

As illustratively shown in FIG. 6A, the function cell 610 includes three gates 615 extending along the Y direction, and each one of the gates 615 has a width D21. The function cell 620 includes three gates 625 extending along the Y direction, and each one of the gates 625 has a width D22. In some embodiment, the width D22 of each of the gates 625 is larger than the width D21 of each of the gates 615. In some embodiments, a threshold voltage Vt21 of each of the gates 615 and a threshold voltage Vt22 of each of the gates 625 are the same.

For simplicity, only one gate 615 and only one gate 625 are labeled in FIG. 6A. The number of the gates 615 in the function cell 610 and the gates 625 in the function cell 620 in FIG. 6A are given for illustrative purposes. Various numbers of the gates 615 and gates 625 are within the contemplated scope of the present disclosure.

For illustration of FIG. 6A, an empty region 630 is located between the function cell 610 and the function cell 620, in which no electrical circuit or component is formed within the empty region 630. In some embodiments, the empty region 630 has a width D23 of two cell pitches.

For illustration, the function cell 610 includes a cut pattern 640 on an edge abutting the empty region 630. The function cell 620 includes a cut pattern 645 on an edge abutting the empty region 630. In some embodiments, the cut pattern 640 and the cut pattern 645 extend along the Y direction. In some embodiments, the cut patterns 640 and 645 are configured to provide electrical isolation to the function cell 610 and the function cell 620 respectively from the empty region 630.

In some embodiments, at least one cell having cut patterns (not shown) is prepared to fill, for example, the empty region 630 in FIG. 6A, in which such a cell may include cut patterns on edges of itself. However, when the cell having cut patterns is to be inserted into the empty region 630 as shown in FIG. 6A, such a design may violate process limitation rule because, for illustration in FIG. 6A, the function cells 610 and 620 already include the cut patterns 640 and 645 respectively on the edge abutting the empty region 630. Accordingly, whether the cell having cut patterns for filling, for illustration, the empty region 630 in FIG. 6A, violate process limitation or not is determined, in some embodiments.

With reference to the method 500 illustrated in FIG. 5 and the integrated circuit 600 illustrated in FIG. 6A, after operation 505, for illustration in operation 510, a condition that the cell (not shown) having cut patterns for filling the empty region 630 violate a process limitation is determined.

With reference to the method 500 illustrated in FIG. 5 and the integrated circuit 600 illustrated in FIG. 6B, in operation 515, a fill cell 650 that is configured without cut pattern is inserted next to the function cell 610 to fill the empty region 630.

In some embodiments, the fill cell 650 is identical to the fill cell 350 illustrated in FIG. 4A. For illustration, the fill cell 650 has a width D24 that is one cell pitch and includes a single gate 655 arranged in a central area of a metal layer (not labeled) underneath the gate 655.

In some embodiments, the gate 655 of the fill cell 650 has a width D25 as same as the width D21 of the gates 615 in the function cell 610.

In operation 520, a fill cell 660 that is configured without cut pattern is inserted next to the function cell 620 to fill the empty region 630.

In some embodiments, the fill cell 660 is identical to the fill cell 350 illustrated in FIG. 4A. For illustration, the fill cell 660 has a width D26 that is one cell pitch and includes a single gate 665 arranged in a central area of a metal layer (not labeled) underneath the gate 665.

In some embodiments, the gate 665 of the fill cell 660 has a width D27 as same as the width D22 of the gates 625 in the function cell 620.

In some embodiments, the gate 655 of the fill cell 650 has a threshold voltage Vt23 and the gate 665 of the fill cell 660 has a threshold voltage Vt24. The threshold voltages Vt23 and Vt24 are the same as the threshold voltage Vt21 of the gates 615 of the function cell 610 and the threshold voltage Vt22 of the gates 625 of the function cell 620.

The gate widths and threshold voltages associated the fill cell, as discussed above, are given for illustrative purposes. Various gate widths and threshold voltages associated the fill cell are within the contemplated scope of the present disclosure. For example, in various embodiments, the threshold voltage Vt23 is different from the threshold voltage Vt21 of the gates 615 of the function cell 610, and/or the threshold voltage Vt24 is different from the threshold voltage Vt24 of the gates 625 of the function cell 620.

In some embodiments, the width D23 of the empty region is two cell pitches, and the width D24 of the fill cell 650 and the width D26 of the fill cell 660 are each one cell pitch. Accordingly, the fill cell 650 and the fill cell 660 together fill the empty region 630.

For illustration of FIG. 6B, the fill cell 650 without the cut pattern shares the cut pattern 640 on the edge of the function cell 610. The fill cell 660 without the cut pattern shares the cut pattern 645 on the edge of the function cell 620.

In some embodiments, a total number of the gate 655 in the fill cell 650 and the gates 615 in the function cell 610 is an even number, and a total number of the gate 665 in the fill cell 660 and the gates 625 in the function cell 620 is an even number. For example, as illustratively shown in FIG. 6B, the total number of the gate 655 and the gates 615 is four, and the total number of the gate 665 and the gates 625 is also four.

In addition to the employment of the gate 655 having the same width and/or the same threshold voltage as those of the gates 615, and the employment of the gate 665 having the same width and/or the same threshold voltage as those of the gates 625, the even number of the gates of the fill cell and the corresponding function cell is also beneficial in keeping the structure of the integrated circuit 600 illustrated in FIG. 6B uniform, as well as satisfying the requirement of placing and routing rule.

As discussed above, in some approaches, the cell including cut patterns on edges of itself violates process limitation rule. Compared to the approaches discussed above, by employing, for illustration, the fill cells 650 and 660 without cut pattern, the process limitation rule will not be violated, and the requirement of placing and routing rule can be satisfied.

In some embodiments, the integrated circuit 600 shown in FIG. 6B corresponds to a portion of the semiconductor device 100 in FIG. 1. For illustration, the integrated circuit 600 shown in FIG. 6B corresponds to a region 140 of the semiconductor device 100 within a dashed line frame illustrated in FIG. 1.

In some embodiments, the layout of the semiconductor device 100 in FIG. 1 or the integrated circuit 600 in FIG. 6B corresponds to at least one design file. In some embodiments, after the empty region of the semiconductor device 100 or the integrated circuit 600 is filled with the fill cells, the semiconductor device 100 or the integrated circuit 600 is able to be fabricated according to the at least one design file.

The number and the order of the operations illustrated in FIG. 5 are given for illustrative purposes. Various numbers and the orders of the operations are within the contemplated scope of the present disclosure.

Figure 7:
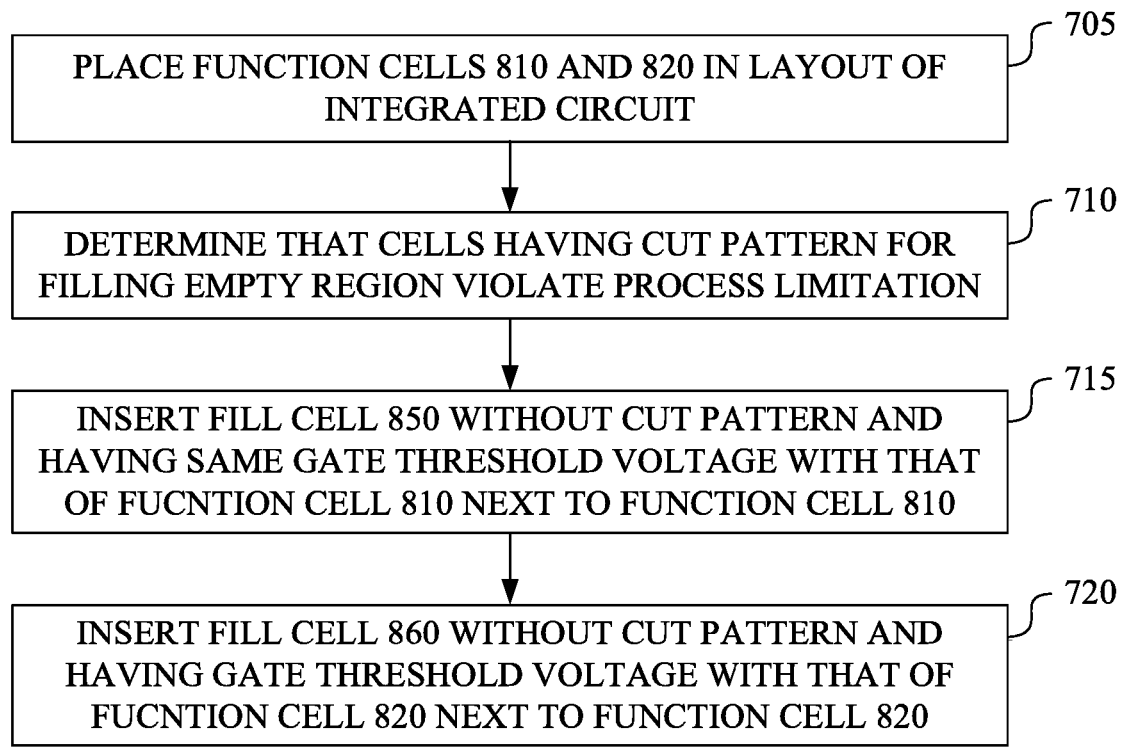
FIG. 7 is yet another flow chart of a method illustrating a layout process of the cells shown in FIG. 1, corresponding to an integrated circuit, in accordance with some embodiments of the present disclosure.

FIG. 7 is yet another flow chart of a method 700 illustrating a layout process of the cells shown in FIG. 1, corresponding to an integrated circuit 800, in accordance with some embodiments of the present disclosure.

Figure 8A:
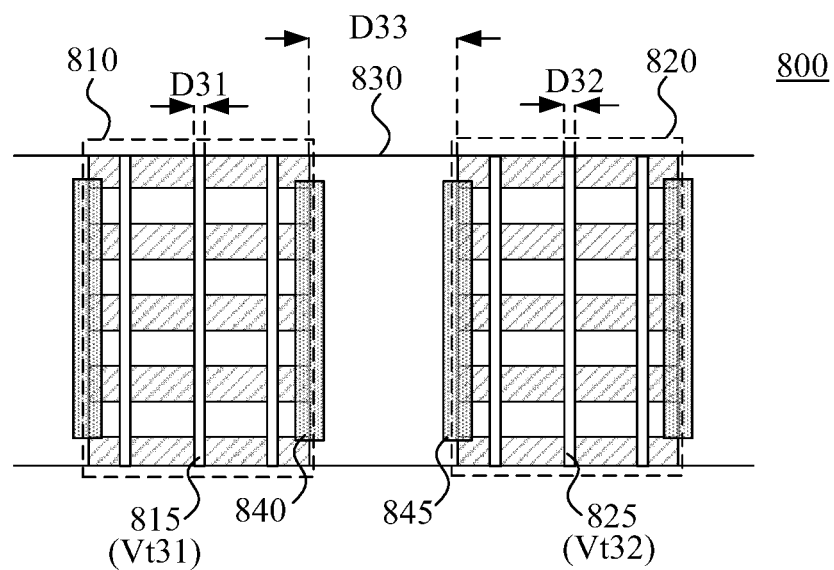
FIG. 8A and FIG. 8B are exemplary layout diagrams of the integrated circuit implemented by using the method illustrated in FIG. 7 in accordance with various embodiments of the present disclosure.
Figure 8B:
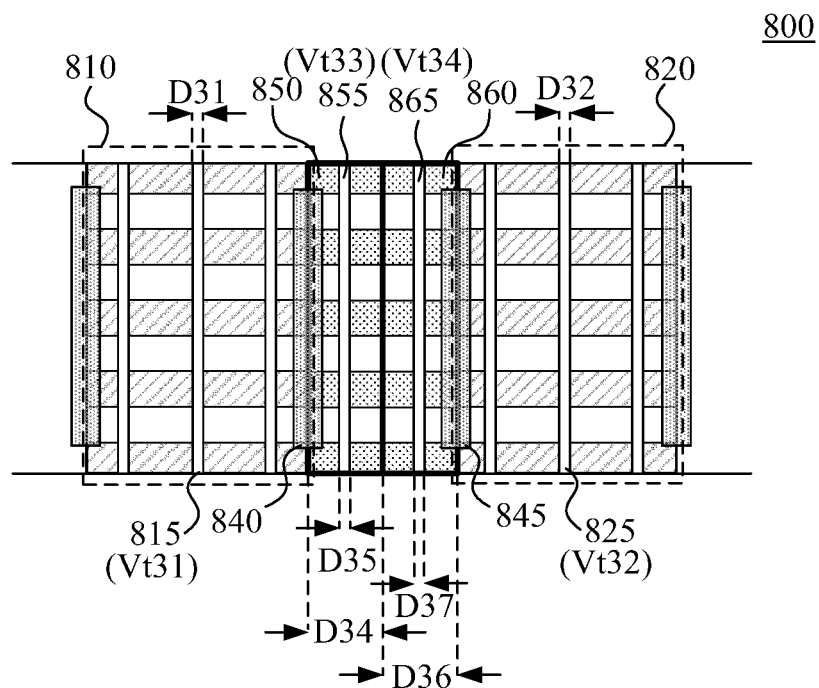

FIG. 8A and FIG. 8B are exemplary layout diagrams of the integrated circuit 800 implemented by using the method illustrated in FIG. 7 in accordance with various embodiments of the present disclosure.

With reference to the method 700 illustrated in FIG. 7 and the integrated circuit 800 illustrated in FIG. 8A, in operation 705, a function cell 810 and a function cell 820 are placed in a layout of the integrated circuit 800. In some embodiments, the layout of the integrated circuit 800 corresponds to at least one design file.

As illustratively shown in FIG. 8A, the function cell 810 includes three gates 815 extending along the Y direction, and each one of the gates 815 has a width D31. The function cell 820 includes three gates 825 extending along the Y direction, and each one of the gates 825 has a width D32. In some embodiments, the width D32 of each of the gates 825 is the same as the width D31 of each of the gates 815. In some embodiments, a threshold voltage Vt32 of each of the gates 825 is larger than a threshold voltage Vt31 of each of the gates 815.

For simplicity, only one gate 815 and only one gate 825 are labeled in FIG. 8A. The number of the gates 815 in the function cell 810 and the gates 825 in the function cell 820 in FIG. 8A are given for illustrative purposes. Various numbers of the gates 815 and gates 825 are within the contemplated scope of the present disclosure.

For illustration of FIG. 8A, an empty region 830 is located between the function cell 810 and the function cell 820, in which no electrical circuit or component is formed within the empty region 830. In some embodiments, the empty region 830 has a width D33 of two cell pitches.

For illustration, the function cell 810 includes a cut pattern 840 on an edge abutting the empty region 830. The function cell 820 includes a cut pattern 845 on an edge abutting the empty region 830. In some embodiments, the cut pattern 840 and the cut pattern 845 extend along the Y direction. In some embodiments, the cut patterns 840 and 845 are configured to provide electrical isolation to the function cell 810 and the function cell 820 respectively from the empty region 830.

In some embodiments, at least one cell having cut patterns (not shown) is prepared to fill, for example, the empty region 830 in FIG. 8A, in which such a cell may include cut patterns on edges of itself. However, when the cell having cut patterns is to be inserted into the empty region 830 as shown in FIG. 8A, such a design may violate process limitation rule because, for illustration in FIG. 8A, the function cells 810 and 820 already include the cut patterns 840 and 845 respectively on the edge abutting the empty region 830. Accordingly, whether the cell having cut patterns for filling, for illustration, the empty region 830 in FIG. 8A, violate process limitation or not is determined, in some embodiments.

With reference to the method 700 illustrated in FIG. 7 and the integrated circuit 800 illustrated in FIG. 8A, after operation 705, for illustration in operation 710, a condition that the cell (not shown) having cut patterns for filling the empty region 830 violate a process limitation is determined.

With reference to the method 700 illustrated in FIG. 7 and the integrated circuit 800 illustrated in FIG. 8B, in operation 715, a fill cell 850 that is configured without cut pattern is inserted next to the function cell 810 to fill the empty region 830.

In some embodiments, the fill cell 850 is identical to the fill cell 350 illustrated in FIG. 4A. For illustration, the fill cell 850 has a width D34 that is one cell pitch and includes a single gate 855 arranged in a central area of a metal layer (not labeled) underneath the gate 855.

In some embodiments, the gate 855 of the fill cell 850 has a threshold voltage Vt33 as same as the threshold voltage Vt31 of the gates 815 in the function cell 810.

In operation 720, a fill cell 860 that is configured without cut pattern is inserted next to the function cell 820 to fill the empty region 830.

In some embodiments, the fill cell 860 is identical to the fill cell 350 illustrated in FIG. 4A. For illustration, the fill cell 860 has a width D36 that is one cell pitch and includes a single gate 865 arranged in a central area of a metal layer (not labeled) underneath the gate 865.

In some embodiments, the gate 865 of the fill cell 860 has a threshold voltage Vt34 as same as the threshold voltage Vt32 of the gates 825 in the function cell 820.

In some embodiments, the gate 855 of the fill cell 850 has a width D35 and the gate 865 of the fill cell 860 has a width D37. The widths D35 and D37 are the same as the widths D31 of the gates 815 of the function cell 810 and the widths D32 of the gates 825 of the function cell 820.

The fill cell 850 and the fill cell 860 together fill the empty region 830 since In some embodiments, the width D33 of the empty region is two cell pitches, and the width D34 of the fill cell 850 and the width D36 of the fill cell 860 are each one cell pitch. Accordingly, the fill cell 850 and the fill cell 860 together fill the empty region 830.

For illustration of FIG. 8B, the fill cell 850 without the cut pattern shares the cut pattern 840 on the edge of the function cell 810. The fill cell 860 without the cut pattern shares the cut pattern 845 on the edge of the function cell 820.

In some embodiments, a total number of the gate 855 in the fill cell 850 and the gates 815 in the function cell 810 is an even number, and a total number of the gate 865 in the fill cell 860 and the gates 825 in the function cell 820 is an even number. For example, as illustratively shown in FIG. 8B, the total number of the gate 855 and the gates 815 is four, and the total number of the gate 865 and the gates 825 is also four.

As illustrated above, the gate 855 having the same width and/or the same threshold voltage as those of the gates 815 is employed, and the gate 865 having the same width and/or the same threshold voltage as those of the gates 825 is employed. In addition, the even number of the gates of the fill cell and the corresponding function cell is also achieved and thus beneficial in keeping the structure of the integrated circuit 800 illustrated in FIG. 8B uniform, as well as satisfying the requirement of placing and routing rule.

In some embodiments, the integrated circuit 800 shown in FIG. 8B corresponds to a portion of the semiconductor device 100 in FIG. 1. For illustration, the integrated circuit 800 shown in FIG. 8B corresponds to the region 140 of the semiconductor device 100 within the dashed line frame illustrated in FIG. 1.

In some embodiments, the layout of the semiconductor device 100 in FIG. 1 or the integrated circuit 800 in FIG. 8B corresponds to at least one design file. In some embodiments, after the empty region of the semiconductor device 100 or the integrated circuit 800 is filled with the fill cells, the semiconductor device 100 or the integrated circuit 800 is able to be fabricated according to the at least one design file.

The number and the order of the operations illustrated in FIG. 7 are given for illustrative purposes. Various numbers and the orders of the operations are within the contemplated scope of the present disclosure.

The configurations of function cells and/or fill cells discussed above are given for illustrative purposes. Various configurations of function cells and/or fill cells are within the contemplated scope of the present disclosure. For example, in various embodiments, the function cells have different gate widths as well as different threshold voltages.

Table 1 illustrates various types of fill cells used to be inserted under different configurations of gate widths and threshold voltages of function cells neighboring the empty region.

TABLE 1

|  | Same threshold voltages | Different threshold voltages |
|---|---|---|
| Same gate widths | Cell with cut pattern | Cell without cut pattern |
| Different gate widths | Cell without cut pattern | Cell without cut pattern |

Figure 9:
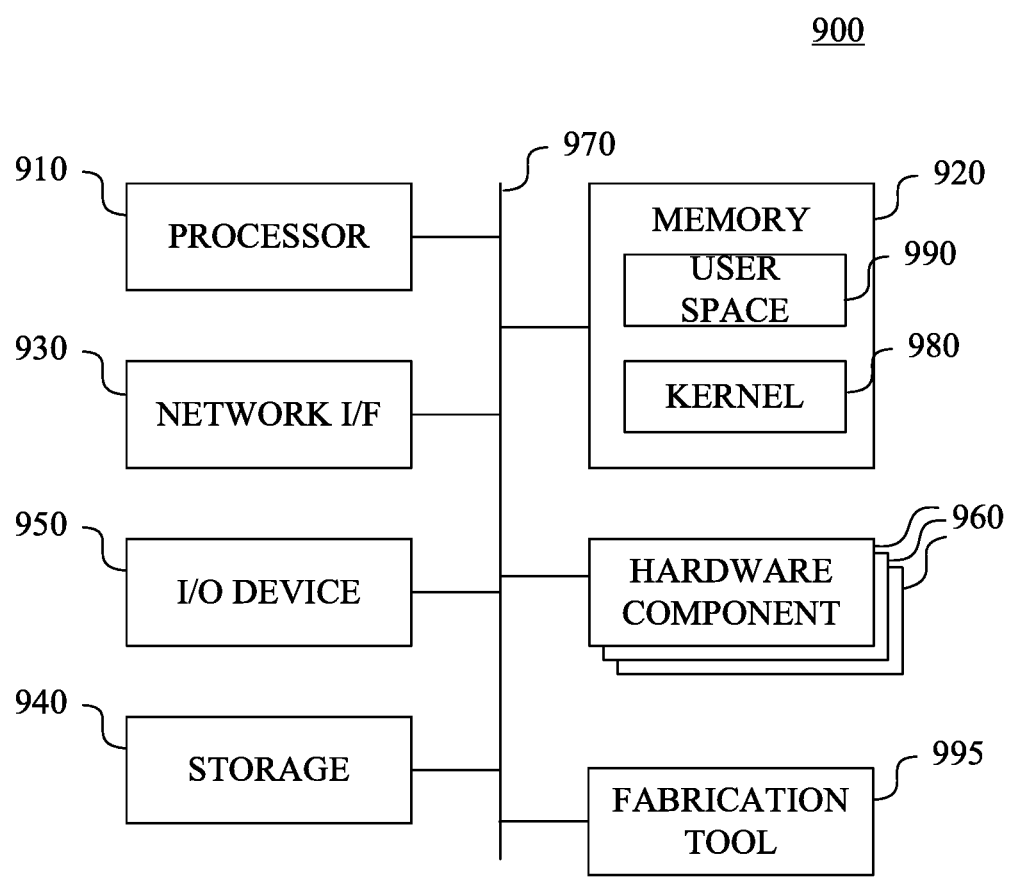
FIG. 9 is a block diagram of a computer system, for illustration, employed to perform the method illustrated in FIG. 2, FIG. 5, or FIG. 7, in accordance with some embodiments of the present disclosure.

FIG. 9 is a block diagram of a computer system 900, for illustration, employed to perform the method illustrated in FIG. 2, FIG. 5, or FIG. 7, in accordance with some embodiments of the present disclosure. One or more of the tools and/or systems and/or operations described with respect to FIGS. 1-8 are realized in some embodiments by one or more computer systems 900 of FIG. 9.

For illustration, the computer system 900 includes a processor 910, a memory 920, a network interface (I/F) 930, a storage 940, an input/output (I/O) device 950, one or more hardware components 960 communicatively coupled via a bus 970 or other interconnection communication mechanism, and a fabrication tool 995.

The memory 920 includes, in some embodiments, a random access memory (RAM) and/or other dynamic storage device and/or read only memory (ROM) and/or other static storage device, coupled to the bus 970 for storing data and/or instructions to be executed by the processor 910. For illustration, the memory 920 includes kernel 980, user space 990, portions of the kernel 980 and/or the user space 990, and components thereof. In some embodiments, the memory 920 is also used, in some embodiments, for storing temporary variables or other intermediate information during execution of instructions to be executed by the processor 910.

In some embodiments, the storage 940, such as a magnetic disk or optical disk, is coupled to the bus 970 for storing data and/or instructions, including, for example, kernel 980, user space 990, etc. The I/O device 950 includes an input device, an output device and/or a combined input/output device for enabling user interaction with the computer system 900. An input device includes, for example, a keyboard, keypad, mouse, trackball, trackpad, and/or cursor direction keys for communicating information and commands to the processor 910. An output device includes, for example, a display, a printer, a voice synthesizer, etc. for communicating information to a user.

In some embodiments, one or more operations and/or functionality of the tools and/or systems described with respect to FIGS. 1-8 are realized by the processor 910, which is programmed for performing such operations and/or functionality. One or more of the memory 920, the network interface 930, the storage 940, the I/O device 950, the hardware components 960, and the bus 970 is/are operable to receive instructions, data, design rules, netlists, layouts, models and/or other parameters for processing by the processor 910.

In some embodiments, the fabrication tool 995 is configured to fabricate the semiconductor device, e.g., the semiconductor device 100 illustrated in FIG. 1, according to the design file processed by the processor 910.

In some embodiments, one or more of the operations and/or functionality of the tools and/or systems described with respect to FIGS. 1-8 is/are implemented by specifically configured hardware (e.g., by one or more application specific integrated circuits or ASIC(s)) which is/are included) separate from or in lieu of the processor 910. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method that includes the steps outlined below. Function cells are placed in a layout of an integrated circuit, wherein the layout corresponds to at least one design file. At least one fill cell that is configured without cut pattern is inserted to fill at least one empty region between the function cells each comprising at least one cut pattern on at least one edge abutting the at least one empty region.

Also disclosed is a method that includes the steps outlined below. Function cells are placed in a layout of an integrated circuit, wherein the layout corresponds to at least one design file. A first fill cell that is configured without cut pattern, is inserted next to a first function cell of the function cells, and a second fill cell that is configured without cut pattern, is inserted next to a second function cell of the function cells, to fill an empty region between the first function cell and the second function cell. At least one first gate of the first fill cell has a first parameter, and at least one second gate of the second fill cell has a second parameter that is different from the first parameter.

Also disclosed is a non-transitory computer-readable medium containing therein instructions which, when executed by a processor of a computer system, cause the processor to execute a method that includes the steps outlined below. A pair of fill cells comprising a first fill cell and a second fill cell that are configured without cut pattern, are inserted to fill an empty region between a first function cell and a second function cell, such that a total number of a first gate in the first fill cell and first gates in the first function cell and a total number of a second gate in the second fill cell and second gates in the second function cell are each an even number.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   placing function cells in a first layout of an integrated circuit; and
   inserting, into the first layout, at least one fill cell that is configured without cut pattern to fill at least one empty region between the function cells each comprising at least one cut pattern on at least one edge abutting the at least one empty region, to form a second layout, wherein the second layout corresponds to at least one design file;
   fabricating the integrated circuit according to the at least one design file.

2. The method of claim 1, wherein inserting at least one fill cell to fill at least one empty region comprises:
   inserting a first fill cell next to a first function cell of the function cells, and a second fill cell next to a second function cell of the function cells, wherein the at least empty region is arranged between the first function cell and the second function cell.

3. The method of claim 2, wherein inserting the first fill cell and the second fill cell comprise:
   inserting the first fill cell comprising at least one first gate having a width as same as a width of gates in the first function cell, and the second fill cell comprising at least one second gate having a width as same as a width of gates in the second function cell.

4. The method of claim 2, wherein inserting the first fill cell and the second fill cell comprise:
   inserting the first fill cell comprising at least one first gate that is configured to have a threshold voltage as same as a threshold voltage of gates in the first function cell, and the second fill cell comprising at least one second gate that is configured to have a threshold voltage as same as a threshold voltage of gates in the second function cell.

5. The method of claim 1, wherein a width of the at least one fill cell is at least one cell pitch.

6. The method of claim 1, wherein inserting at least one fill cell to fill at least one empty region comprises:
   inserting a pair of fill cells comprising a first fill cell and a second fill cell, to fill an empty region, wherein a total number of a first gate in the first fill cell and first gates in the first function cell and a total number of a second gate in the second fill cell and second gates in a second function cell are each an even number.

7. The method of claim 1, wherein inserting at least one fill cell to fill at least one empty region comprises:
   inserting at least one fill cell comprising a single gate arranged in a central region of the at least one fill cell, or two gates arranged on both edges of the at least one fill cell.

8. The method of claim 1, wherein inserting the at least one fill cell comprises:
   inserting a first fill cell sharing a cut pattern with a first function cell of the function cells, and a second fill cell sharing a cut pattern with a second function cell of the function cells.

9. A method, comprising:
   placing function cells in a first layout of an integrated circuit;
   inserting, into the first layout, a first fill cell that is configured without cut pattern, next to a first function cell of the function cells, and a second fill cell that is configured without cut pattern, next to a second function cell of the function cells, to fill an empty region between the first function cell and the second function cell, to form a second layout, wherein the second layout corresponds to at least one design file; and fabricating the integrated circuit according to the at least one design file, wherein at least one first gate of the first fill cell has a first parameter, and at least one second gate of the second fill cell has a second parameter that is different from the first parameter, wherein the first fill cell and the first function cell that is next to the first fill cell are arranged to share a cut pattern on an edge of the first function cell, and the second fill cell and the second function cell that is next to the second fill cell are arranged to share a cut pattern on an edge of the second function cell.

10. The method of claim 9, wherein the first parameter of the at least one first gate corresponds to a width of the at least one first gate, and the second parameter of the at least one second gate corresponds to a width of the at least one second gate.

11. The method of claim 9, wherein the first parameter of the at least one first gate corresponds to a threshold voltage of the at least one first gate, and the second parameter of the at least one second gate corresponds to a threshold voltage of the at least one second gate.

12. The method of claim 9, wherein a width of each of the first fill cell and the second fill cell is at least one cell pitch.

13. The method of claim 9, wherein each of the first fill cell and the second fill cell comprises a single gate arranged in a central region therein, or two gates arranged on both edges thereof.

14. The method of claim 9, wherein a total number of the at least one first gate of the first fill cell and first gates in the first function cell and a total number of the at least one second gate of the second fill cell and second gates in the second function cell are each an even number.

15. The method of claim 9, wherein a width of the at least one first gate of the first fill cell is the same as a width of gates in the first function cell, and a width of the at least one second gate of the second fill cell is the same as a width of gates in the second function cell.

16. The method of claim 9, wherein the at least one first gate of the first fill cell is configured to have a threshold voltage as same as a threshold voltage of gates in the first function cell, and the at least one second gate of the second fill cell is configured to have a threshold voltage as same as a threshold voltage of gates in the second function cell.

17. A non-transitory computer-readable medium containing therein instructions which, when executed by a processor of a computer system, cause the processor to execute a method comprising:

inserting, into a first layout of an integrated circuit, a pair of fill cells comprising a first fill cell and a second fill cell that are configured without cut pattern, to fill an empty region between a first function cell and a second function cell, to form a second layout corresponding to at least one design file, such that a total number of a first gate in the first fill cell and first gates in the first function cell and a total number of a second gate in the second fill cell and second gates in the second function cell are each an even number; and fabricating the integrated circuit according to the at least one design file.

18. The non-transitory computer-readable medium of claim 17, wherein inserting a pair of fill cells comprises:

inserting the first fill cell comprising the first gate having a width as same as a width of the first gates in the first function cell, and the second fill cell comprising the second gate having a width as same as a width of the second gates in the second function cell.

19. The non-transitory computer-readable medium of claim 17, wherein inserting a pair of fill cells comprises:

inserting the first fill cell comprising the first gate that is configured to have a threshold voltage as same as a threshold voltage of the first gates in the first function cell, and the second fill cell comprising the second gate that is configured to have a threshold voltage as same as a threshold voltage of the second gates in the second function cell.

20. The non-transitory computer-readable medium of claim 17, wherein inserting a pair of fill cells comprises:

inserting the first fill cell next to the first function cell to share a cut pattern on an edge of the first function cell, and the second fill cell next to the second function cell to share a cut pattern on an edge of the second function cell.

* * * * *